(12) United States Patent
Clarke

(10) Patent No.: US 11,866,115 B2
(45) Date of Patent: Jan. 9, 2024

(54) STORAGE DEVICE FOR ATTACHING TO A BICYCLE

(71) Applicant: Robert Christopher Clarke, Burnaby (CA)

(72) Inventor: Robert Christopher Clarke, Burnaby (CA)

(*) Notice: Subject to any disclaimer, the term of this patent is extended or adjusted under 35 U.S.C. 154(b) by 0 days.

(21) Appl. No.: 17/152,374

(22) Filed: Jan. 19, 2021

(65) Prior Publication Data

US 2021/0221459 A1     Jul. 22, 2021

Related U.S. Application Data

(60) Provisional application No. 62/963,479, filed on Jan. 20, 2020.

(51) Int. Cl.
    *B62J 9/21*             (2020.01)
    *B62J 9/27*             (2020.01)

(52) U.S. Cl.
    CPC .. *B62J 9/21* (2020.02); *B62J 9/27* (2020.02)

(58) Field of Classification Search
    CPC ....... B62J 9/21; B62J 9/27; B62J 50/26; B62J 7/06; B62J 9/00; B62J 9/23; B62J 9/24; B62J 50/25; B62J 9/20; Y10T 24/14; F16L 3/233; F16L 3/137; F16L 3/12
    USPC ....................................................... 224/421
    See application file for complete search history.

(56) References Cited

U.S. PATENT DOCUMENTS

| | | | | |
|---|---|---|---|---|
| 5,375,748 A | * | 12/1994 | Katz | B62J 9/00 224/420 |
| 5,803,328 A | | 9/1998 | Toshikazu | |
| 5,829,656 A | * | 11/1998 | Reitz | B62J 11/00 224/417 |
| 5,913,466 A | * | 6/1999 | Revels | B62J 9/21 224/421 |
| 6,279,803 B1 | | 8/2001 | Smerdon, Jr. | |
| 6,802,440 B1 | * | 10/2004 | Stowell | B62J 9/26 190/110 |
| D515,015 S | * | 2/2006 | Morgan | D12/409 |

(Continued)

FOREIGN PATENT DOCUMENTS

| | | | | |
|---|---|---|---|---|
| DE | 3332208 A1 | | 3/1985 | |
| DE | 3501165 A1 | * | 7/1986 | B62J 11/00 |

(Continued)

OTHER PUBLICATIONS

DE 3501165 A1 Translation, Pfeiffer, Jul. 1986 (Year: 1986).*
DE-10242032-A1 Translation, Mijnen, Mar. 2004 (Year: 2004).*
DE 202009015130 U1 Translation, Feb. 2010 (Year: 2010).*

*Primary Examiner* — Nathan J Newhouse
*Assistant Examiner* — Matthew T. Theis
(74) *Attorney, Agent, or Firm* — D'Ambrosio & Menon, PLLC; Usha Menon

(57) ABSTRACT

There is described a storage device for attaching to a bicycle. The storage device includes an identification plate having a front face and a rear face. The front face comprises an identifier for identifying a rider of the bicycle. The storage device also includes a storage compartment attached to the rear face of the identification plate. The storage device also includes at least one mounting device configured so as to enable the storage device to be attached to a front portion of the bicycle, such as the bicycle's handlebars or front fork.

12 Claims, 13 Drawing Sheets

(56) References Cited

U.S. PATENT DOCUMENTS

| | | | |
|---|---|---|---|
| 7,104,585 B2 * | 9/2006 | Miura | F16B 2/185 296/78.1 |
| 9,022,266 B1 * | 5/2015 | Kleppin | B62J 9/00 224/413 |
| 9,452,799 B2 * | 9/2016 | Maguire | B62J 7/04 |
| 2004/0031834 A1 | 2/2004 | Barr | |
| 2004/0124652 A1 | 7/2004 | Garrison | |
| 2005/0087575 A1 | 4/2005 | Samsel et al. | |
| 2007/0068985 A1 | 3/2007 | Nakahara | |
| 2010/0170925 A1 | 7/2010 | Osten et al. | |
| 2013/0032001 A1 | 2/2013 | Smart | |
| 2016/0297461 A1 | 10/2016 | Barr-Perea | |

FOREIGN PATENT DOCUMENTS

| | | | |
|---|---|---|---|
| DE | 10242032 A1 * | 3/2004 | B62J 7/08 |
| DE | 202009015130 U1 * | 2/2010 | B62J 7/06 |
| EP | 2711276 B1 | 6/2015 | |
| EP | 2241497 B1 | 9/2016 | |
| JP | 5586074 B1 | 9/2014 | |
| WO | 2010078585 A1 | 7/2010 | |

* cited by examiner

STORAGE DEVICE FOR ATTACHING TO A BICYCLE

CROSS-REFERENCE TO RELATED APPLICATION

This application claims priority from U.S. Provisional Patent Application Ser. No. 62/963,479 filed on Jan. 20, 2020, the entire disclosures of which are part of the disclosure of the present application and are hereby incorporated by reference in their entireties.

TECHNICAL FIELD

The present disclosure relates to a storage device for attaching to a bicycle, such as a mountain bike.

BACKGROUND

Riders of bicycles often carry with them personal items during their ride. For example, a rider may wear a backpack for storing items such as their keys, phone, wallet, and warm clothing. Backpacks, however, add weight and can be cumbersome when riding a bike, especially over extended periods of time.

Therefore, with the aim of avoiding use of a backpack, some riders may choose to attach personal items directly to the bike. For example, there exist storage solutions for attaching items directly to a bike.

SUMMARY

According to a first aspect of the disclosure, there is provided a storage device for attaching to a bicycle, comprising: an identification plate having a front face and a rear face, wherein the front face comprises an identifier for identifying a rider of the bicycle; a storage compartment attached to the rear face of the identification plate; and at least one mounting device configured so as to enable the storage device to be attached to a front portion of the bicycle.

The at least one mounting device may be configured so as to enable the storage device to be attached to one or more of: one or more handlebars of the bicycle; and one or more stanchions of a front fork of the bicycle.

The at least one mounting device may comprise first and second mounting devices spaced apart by a distance of from about 2 inches to about 10 inches.

The at least one mounting device may comprise first and second mounting devices spaced equally from an axis dividing the storage device into left and right halves.

The at least one mounting device may comprise first, second, third, and fourth mounting devices positioned relative to one another so as enable the storage device to be attached to dual stanchions of a front fork of the bicycle by attaching the first, second, third, and fourth mounting devices to the dual stanchions.

The first and second mounting devices may be spaced apart by a distance of from about 6 inches to about 8 inches, and the first and third mounting devices may be spaced apart by a distance of from about 3 inches to about 6 inches.

The at least one mounting device may extend from the rear face of the identification plate.

The at least one mounting device may extend from the storage compartment.

The at least one mounting device may comprise one or more clamps, snap-fit connectors, or straps.

The storage compartment may comprise one or more securing members for securing one or more items to an exterior of the storage compartment.

The one or more securing members may comprise one or more straps.

The at least one mounting device may comprise a steer tube mounting bracket comprising an aperture formed therein and configured to enable the storage device to be attached to the bicycle by inserting a steer tube of the bicycle through the aperture.

The aperture may have a diameter of about from about 1.125 inches to about 1.5 inches.

The storage compartment may comprise first and second portions rotatably movable relative to one another from a closed position, in which access to an interior of the storage compartment is prevented, to an open position, in which access to the interior of the storage compartment is allowed.

The identification plate may comprise one of the first and second portions.

The storage compartment may comprise one or more walls defining an interior of the storage compartment, and a cover movable relative to the one or more walls for enabling and preventing access to the interior of the storage compartment.

The storage device may further comprise a removable insert stored within the storage compartment.

The insert may comprise one or more recessed portions for storing one or more items therein.

The one or more recessed portions may be configured to at least partially receive therein one or more of: a mobile device; one or more keys; and a tool for maintenance or repair of the bicycle.

The storage compartment may be rectangular or trapezoidal.

According to a further aspect of the disclosure, there is provided a bicycle comprising attached to a front portion thereof a storage device according to any of the above-described embodiments.

According to a further aspect of the disclosure, there is provided a kit of parts comprising: an identification plate having a front face and a rear face, wherein the front face comprises an identifier for identifying a rider of a bicycle; a storage compartment for attaching to the rear face of the identification plate; and at least one mounting device for attaching to the rear face of the identification plate or for attaching to the storage compartment, wherein the at least one mounting device is configured so as to enable the identification plate or the storage compartment to be attached to a front portion of the bicycle.

The kit of parts may further comprise an insert for storing within the storage compartment.

According to a further aspect of the disclosure, there is provided a storage device for attaching to a bicycle, comprising: a storage compartment having a front face and a rear face, wherein the front face comprises an identifier for identifying a rider of the bicycle; and at least one mounting device extending from the rear face of the storage compartment and configured so as to enable the storage device to be attached to a front portion of the bicycle. The front face of the storage compartment may comprise an identification plate.

The storage device may comprise any of the features described above in connection with the first aspect of the disclosure.

According to a further aspect of the disclosure, there is provided a storage device for attaching to a bicycle, comprising: a storage compartment; and first and second mounting devices extending from the storage compartment and spaced apart by a distance of from about 5 inches to about 8 inches so as to enable the storage device to be attached to one or more stanchions of a front fork of the bicycle.

According to a further aspect of the disclosure, there is provided a storage device for attaching to a bicycle, comprising: a storage compartment; and first, second, third, and fourth mounting devices extending from the storage compartment and configured so as to enable the storage device to be attached to dual stanchions of a front fork of the bicycle.

BRIEF DESCRIPTION OF THE DRAWINGS

Embodiments of the disclosure will now be described in detail in conjunction with the accompanying drawings of which.

DETAILED DESCRIPTION

The present disclosure seeks to provide an improved storage device for attaching to a bicycle. While various embodiments of the disclosure are described below, the disclosure is not limited to these embodiments, and variations of these embodiments may fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

According to embodiments of the disclosure, there is described a novel storage device for attaching to a bicycle. According to some embodiments, the storage device includes a storage compartment attached to, or otherwise incorporating, an identification plate, such as a number plate. For riders of bicycles, especially those racing under competitive conditions, the identification plate may enable organizers and spectators to easily identify the rider. In addition, the rider may store one or more items within the storage compartment, such as personal items including keys and a mobile device, for example. The storage device is attached to a front portion of the bike using one or more mounting devices. The front portion of the bike may include any portion of the bike that lies forward of the rider, and in particular may include the bike's handlebars, stem, single or dual crowns, stanchions, and steer tube. For example, the storage device may be mounted to the bike's handlebars, or to dual crown fork stanchions of a front fork of the bike.

Figure 1:
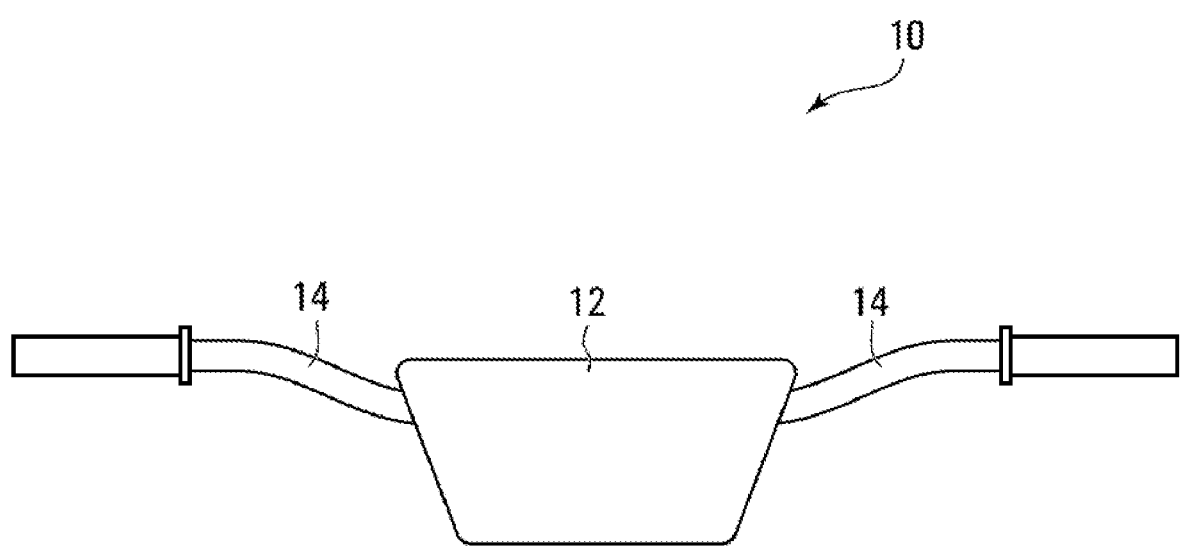
FIG. 1 is a front view of a storage device attached to handlebars of a bicycle, according to an embodiment of the disclosure.

Turning to FIG. 1, there is shown a front view of a storage device 10 according to a first embodiment of the disclosure. Storage device 10 comprises an identification plate 12 (which may also be referred to as a number plate, license plate, race plate, number board, or registration plate). Identification plate 12 is attached to a storage compartment 16 (not shown in FIG. 1). Identification plate 12 includes on a front face thereof one or more identifying means for identifying a rider of the bike. For example, identification plate 12 may include a sequence of digits and/or letters, and may additionally or alternatively depict one or more pictograms associated with the rider. According to some embodiments, identification plate 12 may display the rider's name. According to some embodiments, identification plate 12 may depict one or more graphics or artwork to enhance the visual appearance of the bike. In FIG. 1, storage device 10 is shown attached to handlebars 14 of a bike. According to some embodiments, the diameter of the handlebars at the locations where the storage device may be mounted to the handlebars may be from about 25 mm to about 37 mm.

Figure 2:
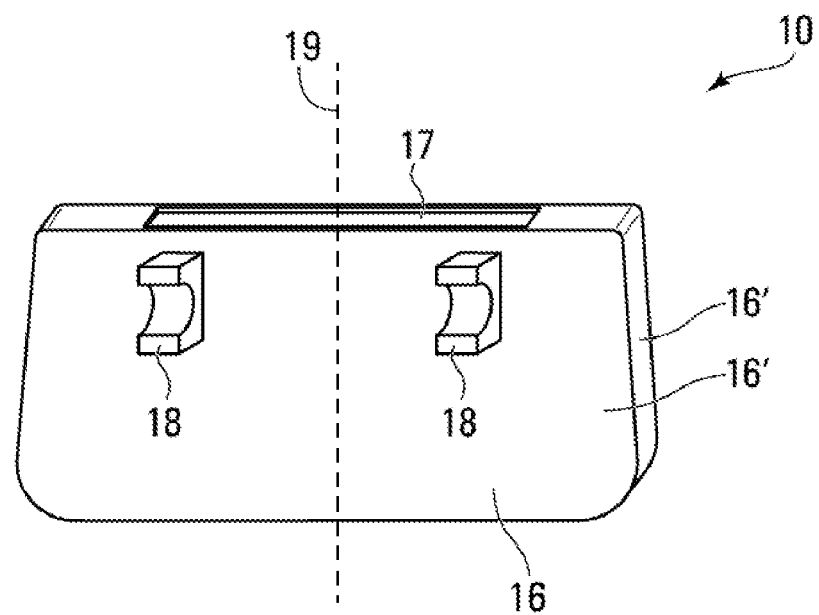
FIGS. 2 and 3 are respective rear and perspective views of a storage device according to an embodiment of the disclosure.
Figure 3:
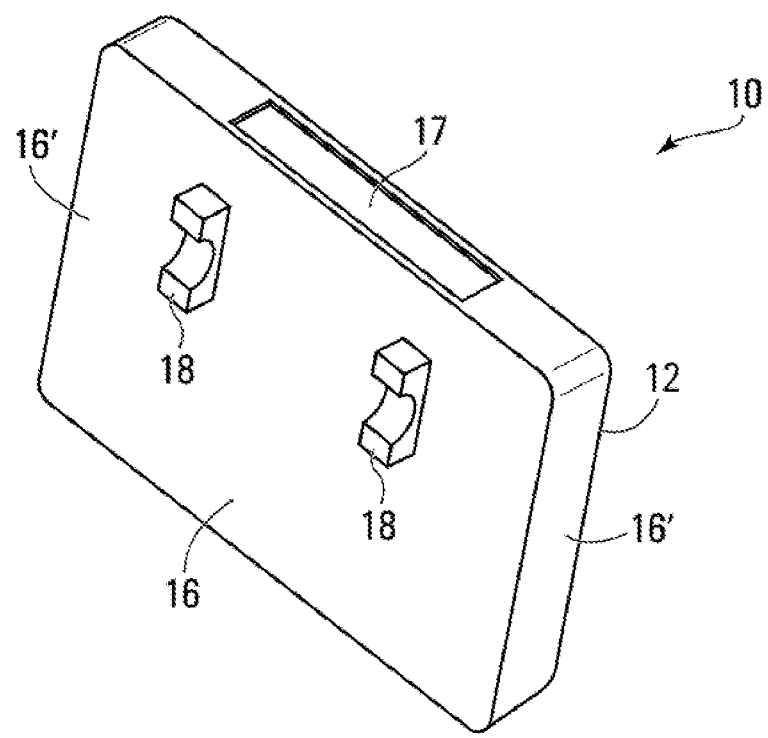

Turning to FIGS. 2 and 3, there are shown respective rear and side perspective views of storage device 10, depicting storage compartment 16. Storage compartment 16 comprises a base and sidewalls 16' defining an enclosure with an opening 17 at a top end of storage compartment 16. Storage compartment 16 is attached or otherwise secured to identification plate 12. For example, identification plate 12 may be screwed onto storage compartment 16.

According to some embodiments, identification plate 12 may include sidewalls, and a rear plate may be screwed onto or otherwise attached to the sidewalls of identification plate 12 in order to form storage compartment 16. According to some embodiments, identification plate 12 and storage compartment 16 may be integrally formed, such that identification plate 12 may effectively form a front wall of storage compartment 16. For example, a front face of storage compartment 16 may comprise one or more identifiers for identifying a rider of the bicycle. According to embodiments in which the identification plate is attached to sidewalls, the identification plate may be detached from the sidewalls. Thus, the shape and/or appearance of the front of the storage device may be adjusted, by replacing the identification plate with another, different identification plate.

Storage compartment 16 may include a single enclosure for storing one or more personal items of the rider, or alternatively may comprise multiple separate enclosures. For example, within the enclosure defined by the base and sidewalls 16' of storage compartment 16, one or more partitions may be provided for dividing the enclosure into multiple smaller enclosures. One or more items may be stored within storage compartment 16, by inserting such items through opening 17 defined in the top of storage compartment 16.

On a rear-facing sidewall 16' of storage compartment 16 are provided a pair of mounting devices 18. According to some embodiments, each mounting device 18 is formed as a clamp for attaching storage device 10 to the bike by clamping or otherwise attaching mounting devices 18 to handlebars 14. The drawings of the disclosure generally depict mounting devices 18 as comprising first portions of clamps. In order to clamp mounting devices 18 to the handlebars of the bike, second portions of the clamps are fixed to their respective first portions (for example using bolts) to substantially encircle and clamp mounting devices 18 to the handlebars. According to some embodiments, mounting devices 18 may comprise straps, such as zap straps.

Figure 15A:
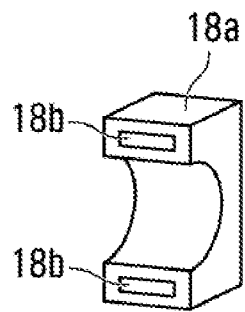
FIGS. 15A-15C show different types of mounting devices, according to embodiments of the disclosure.
Figure 15B:
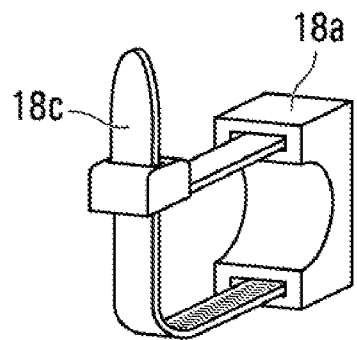
Figure 15C:
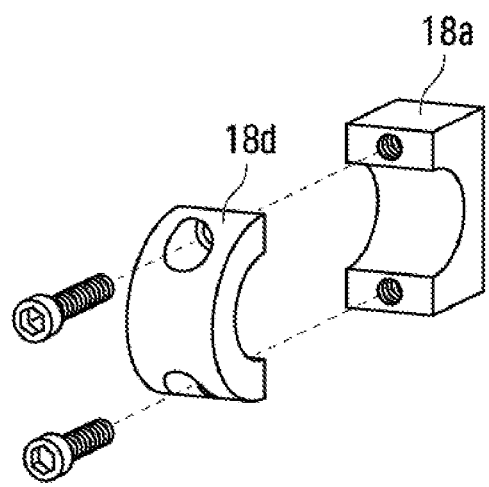

FIGS. 15A-15C show examples of different types of mounting devices 18 that may be used. FIG. 15A shows a first clamp portion 18a with apertures 18b formed therein. Apertures 18b are connected by a conduit. A strap, such as a zap strap 18c (FIG. 15B), may be passed through the conduit in order to enable first clamp portion 18a to be secured to the bike. FIG. 15C shows an example of a second clamp portion 18d being coupled to first clamp portion 18a using bolts.

According to some embodiments, mounting devices 18 may be spaced apart by a distance of from about 2 inches to about 10 inches, thereby enabling mounting devices 18 to be fixed to respective handlebars 14 of the bike. According to some embodiments, mounting devices 18 are spaced equally from a vertical axis (such as axis 19) dividing storage device 10 into equal left and right halves.

In the embodiments of FIGS. 1-3, the dimensions of storage compartment 16 are roughly similar to those of identification plate 12. Therefore, when the bike is viewed from the front, identification plate 12 substantially obscures storage compartment 16 from view, such that the appearance of the bike as seen from the front is not substantially altered by the inclusion of storage device 10.

Figure 12:
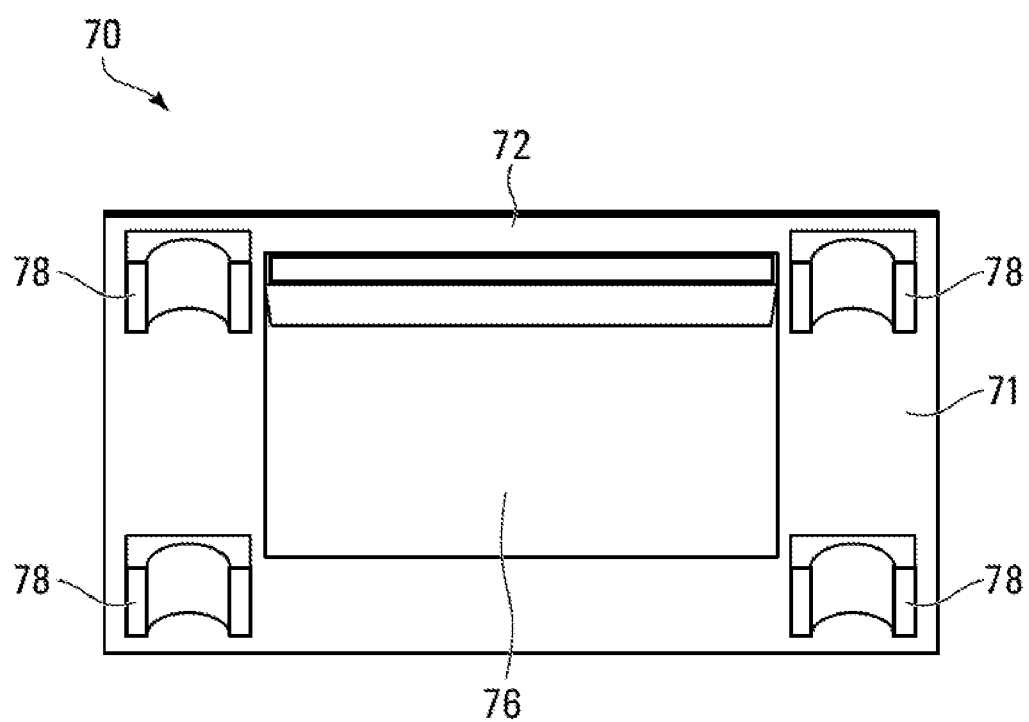
FIG. 12 is a rear view of a storage device for attaching to dual stanchions of a front fork of a bicycle, according to an embodiment of the disclosure.

Furthermore, in the embodiments of FIGS. 1-3, mounting devices 18 are secured directly to and extend away from storage compartment 16. However, according to other embodiments, mounting devices 18 may be secured directly to identification plate 12 (for example as can be seen in the embodiment of FIG. 12).

Figure 4:
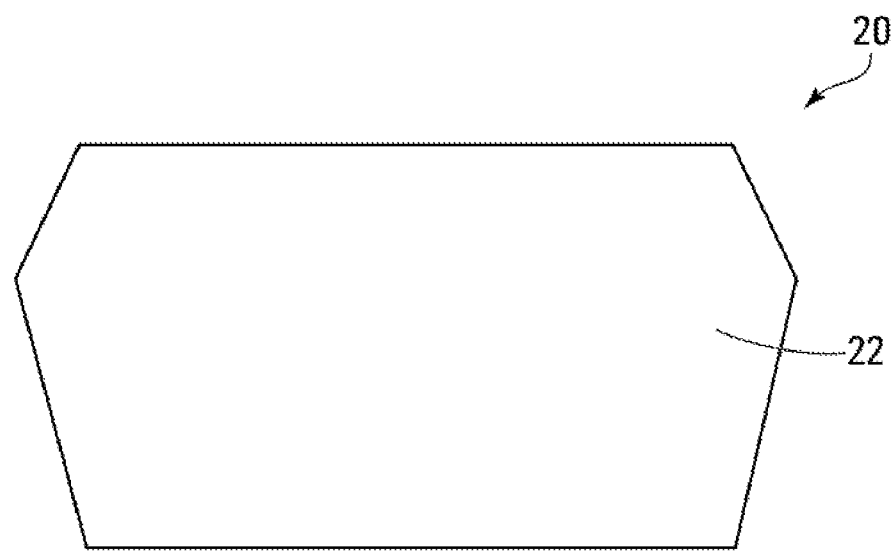
FIG. 4 is a front view of a storage device according to an embodiment of the FIG. 5 is a rear view of the storage device of FIG. 4.
Figure 5:
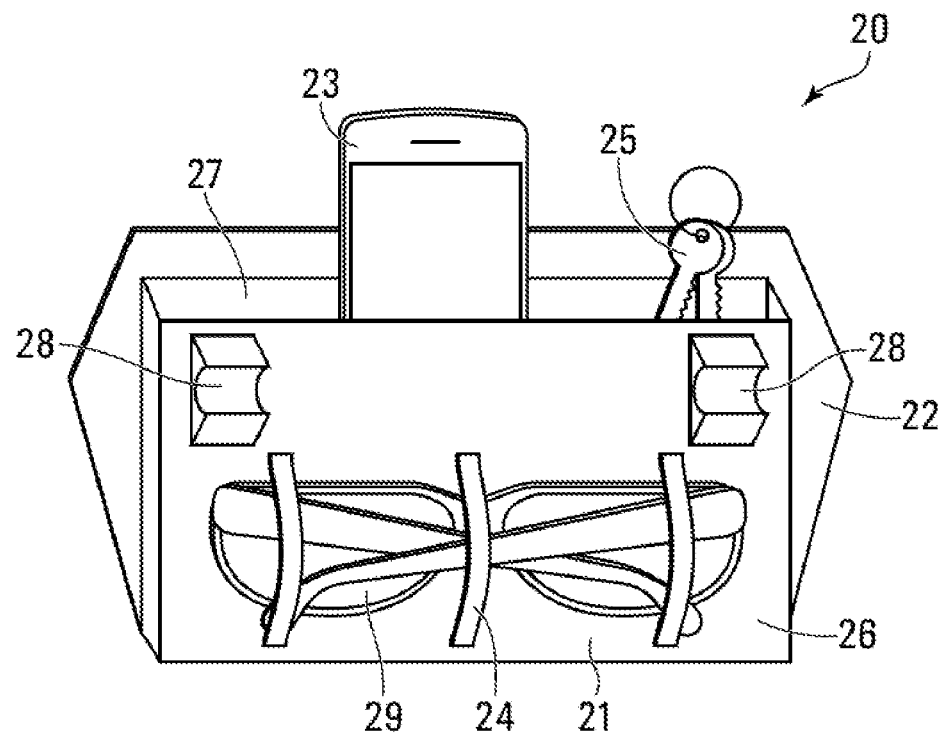

Turning to FIGS. 4 and 5, there is shown another embodiment of a storage device 20. The front view of storage device 20 (FIG. 4) shows identification plate 22. FIG. 5 shows a rear side of storage device 20, in which mounting devices 28 are attached to a rear-facing sidewall 21 of a storage compartment 26. Storage compartment 26 includes securing members, in the form of straps 24, attached to sidewall 21. Straps 24 may be used, for example, to secure items such as sunglasses, goggles, or other eyewear 29 for use by the rider. FIG. 5 also shows items, including a mobile device 23 and keys 25, being stored within storage compartment 26 by being inserted into the enclosure through opening 27.

Figure 6:
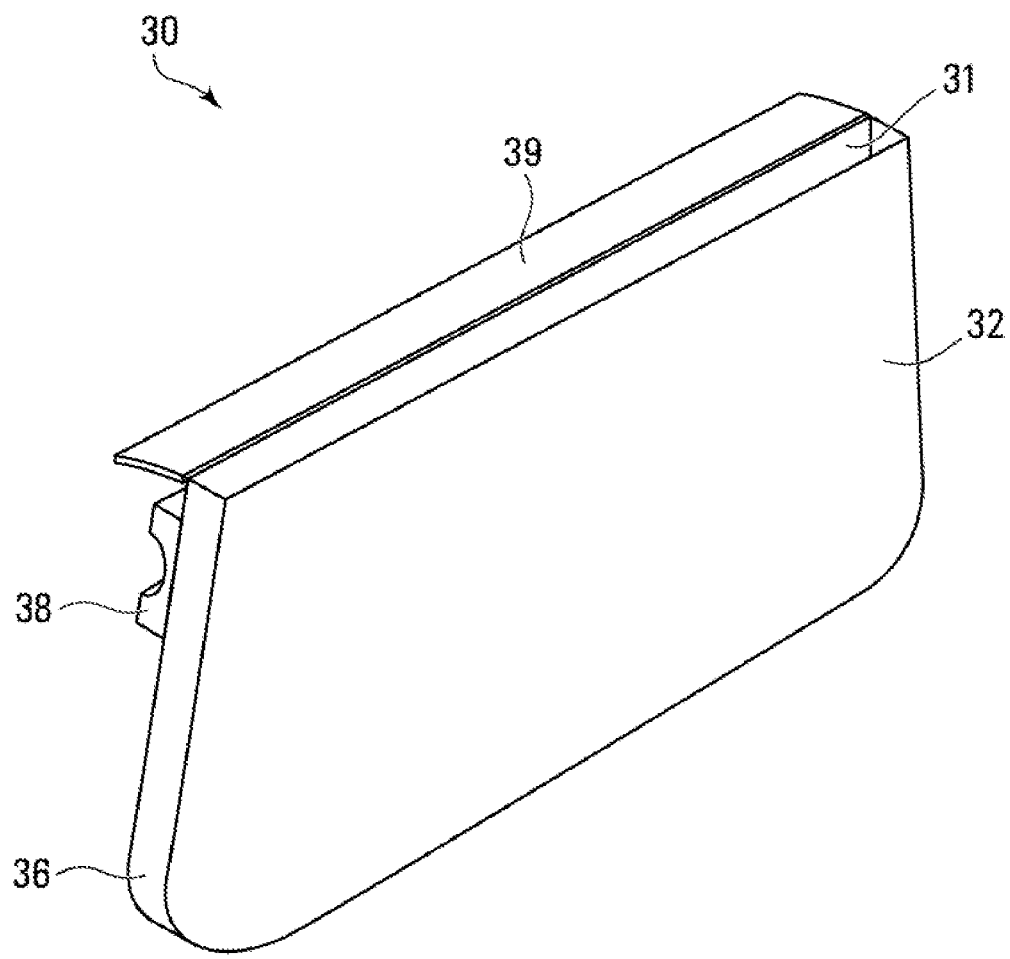
FIG. 6 is a front view of a storage device according to an embodiment of the disclosure.

Turning to FIG. 6, there is shown a front of a storage device 30. In addition to identification plate 32, storage compartment 36, and mounting device 38, storage device 30 further comprises a lid 39 or similar cover for closing opening 31. Lid 39 is configured to pivot relative to a sidewall of storage compartment 36 and thereby alternately close and open opening 31. According to some embodiments, storage device 30 may additionally include a lock for locking lid 39 in a closed position.

Figure 7:
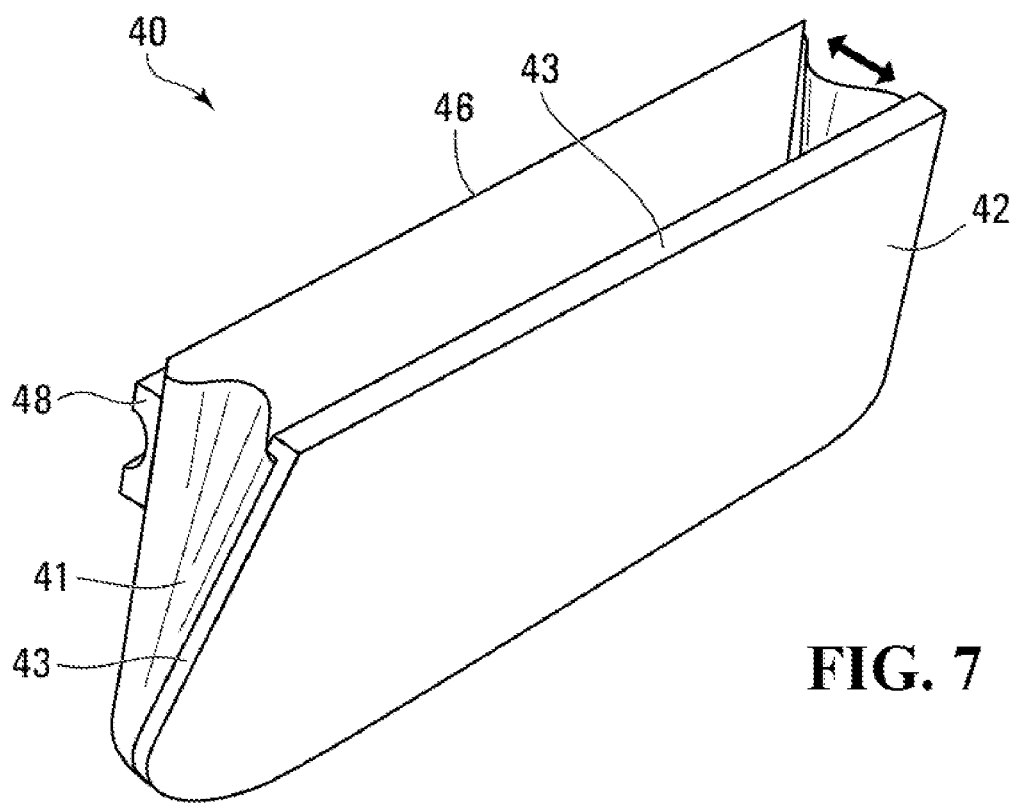
FIG. 7 is a front view of a storage device according to an embodiment of the disclosure.
Figure 8:
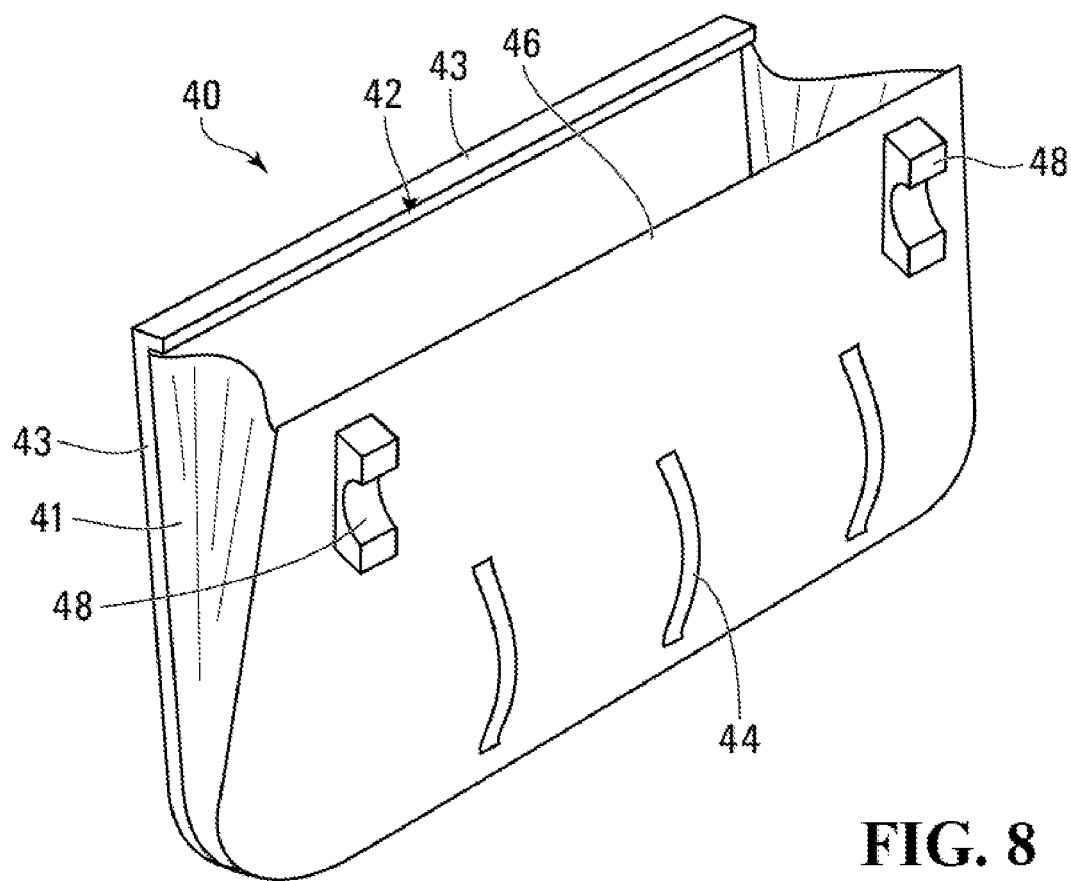
FIG. 8 a rear view of the storage device of FIG. 7.

Turning to FIGS. 7 and 8, there is shown a storage device 40 according to another embodiment. Storage device 40 includes an identification plate 42 pivotally connected to a rear plate 46. Flexible fabric 41 or the like interconnects identification plate 42 and rear plate 46. By pivoting identification plate 42 relative to rear plate 46, a storage compartment defined by identification plate 42, rear plate 46, and fabric 41 may be alternately opened and closed. In this embodiment, identification plate 42 includes sidewalls 43 such that, when identification plate 42 is moved to the closed position by pivoting toward rear plate 46, a storage compartment is closed. Storage compartment 40 includes means (not shown) for locking identification plate 42 to rear plate 46. As can be seen in FIG. 8, rear plate 46 includes securing members, in the form of straps 44, for securing items to rear plate 46 (such as protective eyewear). In an alternative embodiment, identification plate 42 may be configured to slide (as opposed to rotate) relative to rear plate 46.

Figure 9A:
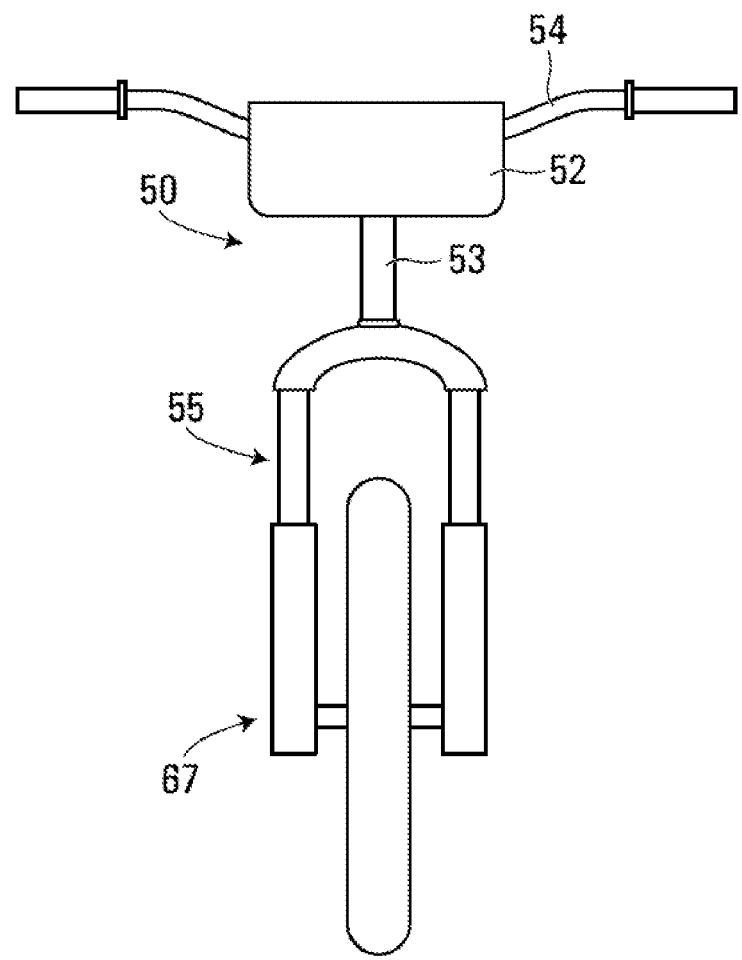
FIG. 9A is a front view of a storage device attached to a bicycle having a single crown fork, according to an embodiment of the disclosure.
Figure 9B:
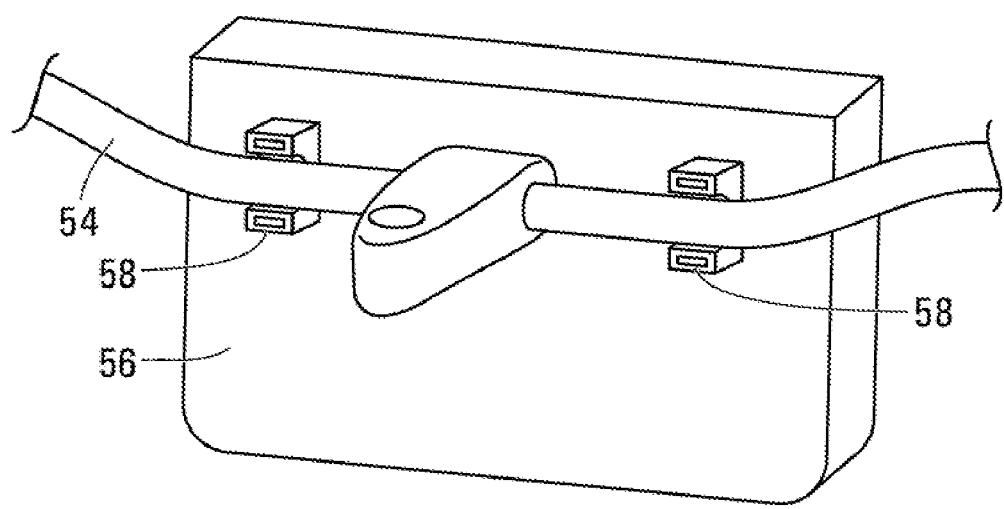
FIG. 9B is a rear view of the storage device of FIG. 9A.
Figure 10:
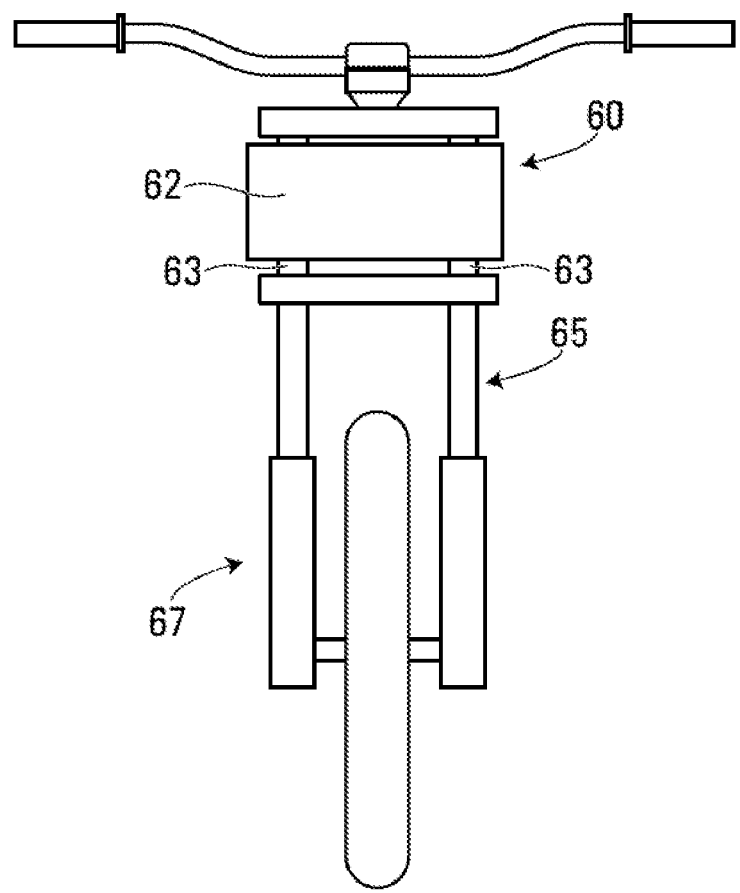
FIG. 10 is a front view of a storage device attached to dual stanchions of a front fork of a bicycle, according to an embodiment of the disclosure.

Turning now to FIG. 9A, there is shown a storage device 50 attached to handlebars 54 of a bicycle 57. FIG. 9B shows a rear view of storage device 50 attached to handlebars 54 using mounting devices 58. According to some embodiments, instead of being mounted to the handlebars of a bicycle, storage devices as described herein may be attached to other parts of the front portion of the bicycle. For example, according to some embodiments, storage devices as described herein may be attached to a front fork of the bicycle. In particular, FIG. 10 shows a storage device 60 attached to dual stanchions 63 of a dual crown front fork 65 of a bicycle 67. Typically, downhill mountain bikes include dual crown forks as part of their front suspension.

Figure 11:
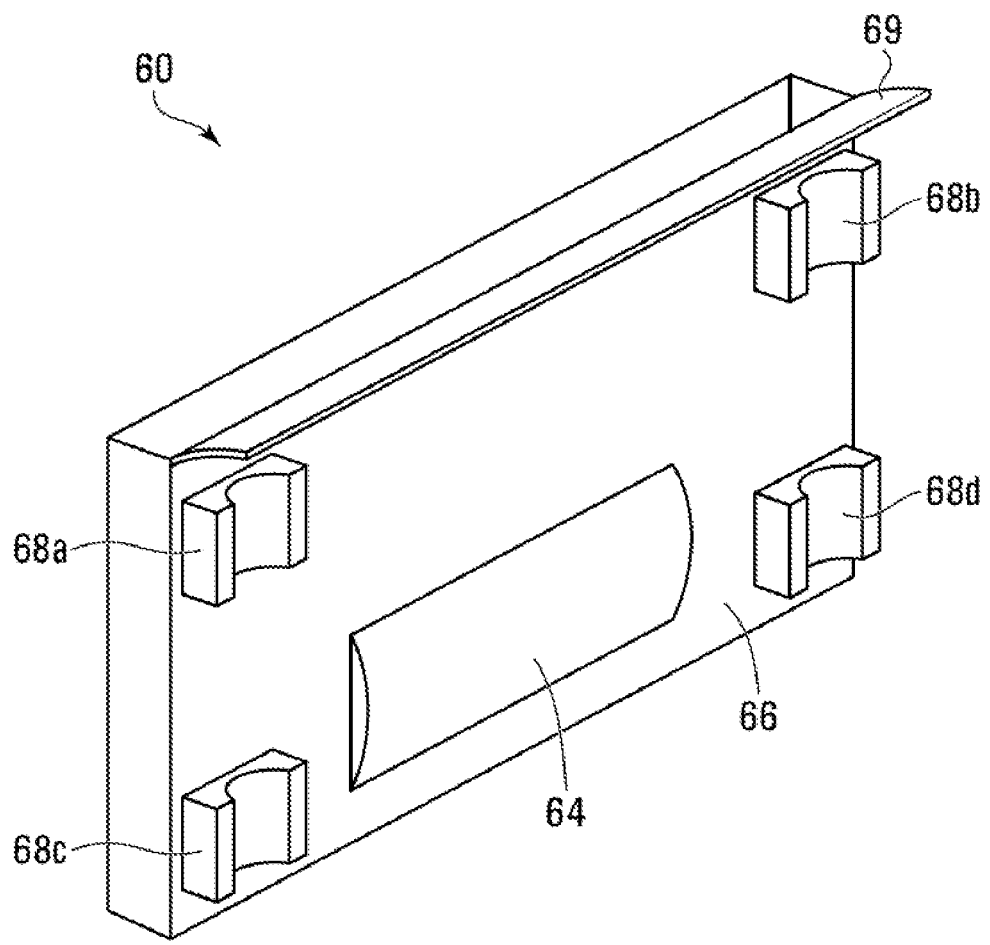
FIG. 11 is a rear view of a storage device for attaching to dual stanchions of a front fork of a bicycle, according to an embodiment of the disclosure.

An example of storage device 60 that may be attached to dual stanchions 63 of dual crown front fork 65 is shown in FIG. 11. Storage device 60 includes a storage compartment 66 attached to a rear face of an identification plate (not shown). Four mounting devices 68a-d, in the form of clamps, are provided on and extend away from a rear face of storage compartment 66. The horizontal and vertical separations of mounting devices 68a-d are selected such that storage device 60 may be attached directly to dual stanchions 63 of front fork 65. According to some embodiments, mounting devices 68a and 68b, and mounting devices 68c and 68d, are separated by a distance of from about 6 inches to about 8 inches. According to some embodiments, mounting devices 68a and 68c, and mounting devices 68b and 68d, are separated by a distance of from about 3 inches to about 6 inches. Storage compartment 66 further includes a storage member, in the form of pouch 64, for securing items (such as protective eyewear) to the rear face of storage compartment 66.

In the embodiment of FIG. 11, mounting devices 68a-d are secured directly to storage compartment 66. However, as mentioned above, the mounting devices may instead be attached directly to the identification plate. For example, as can be seen in the embodiment of FIG. 12, the length and width of an identification plate 72 are greater than those of its associated storage compartment 76 such that identification plate 72 extends beyond the edges of storage compartment 76, thereby defining an overlap portion 71. Mounting devices 78 are attached to identification plate 72 on overlap portion 71.

Figure 13:
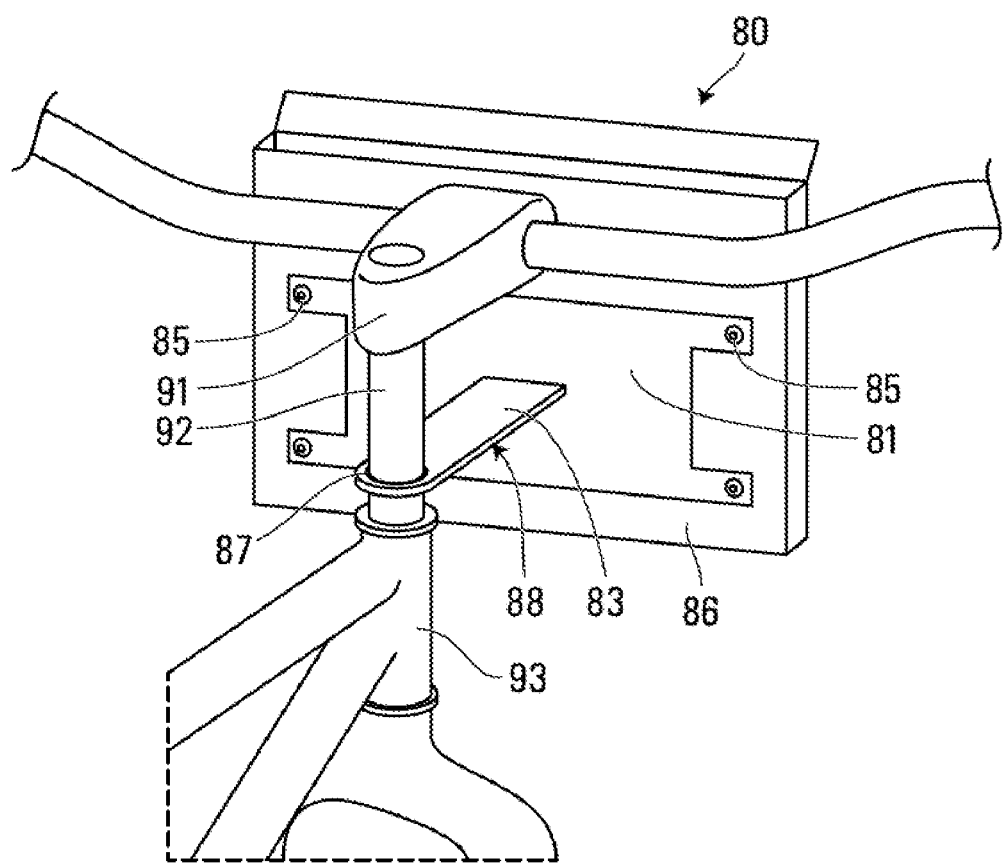
FIG. 13 shows a storage device being attached to a steer tube of a bicycle, according to an embodiment of the disclosure.

FIG. 13 shows another embodiment of a storage device 80. In this embodiment, storage device 80 is configured to attach directly to a fork steer tube 92 of a bicycle 93. In particular, storage device 80 includes a steer tube bracket 88 comprising a bracket mount 81 and an arm 83 extending therefrom. Bracket mount 81 is attached or otherwise secured to storage compartment 86, for example using one or more rivets 85 or other fasteners. At an opposing end of arm 83 is located an aperture 87 formed within arm 83. Aperture 87 is configured to receive therethrough fork steer tube 92 of bike 93. According to some embodiments, aperture has a diameter of from about 1.125 inches to about 1.5 inches. In order to attach storage device 80 to bike 93, handlebar stem 91 is first removed from fork steer tube 92, and steer tube bracket 88 is then mounted over fork steer tube 92 by inserting fork steer tube 92 through aperture 87. Reinstallation of handlebar stem 91 then fastens steer tube bracket 88 in place.

Figure 14:
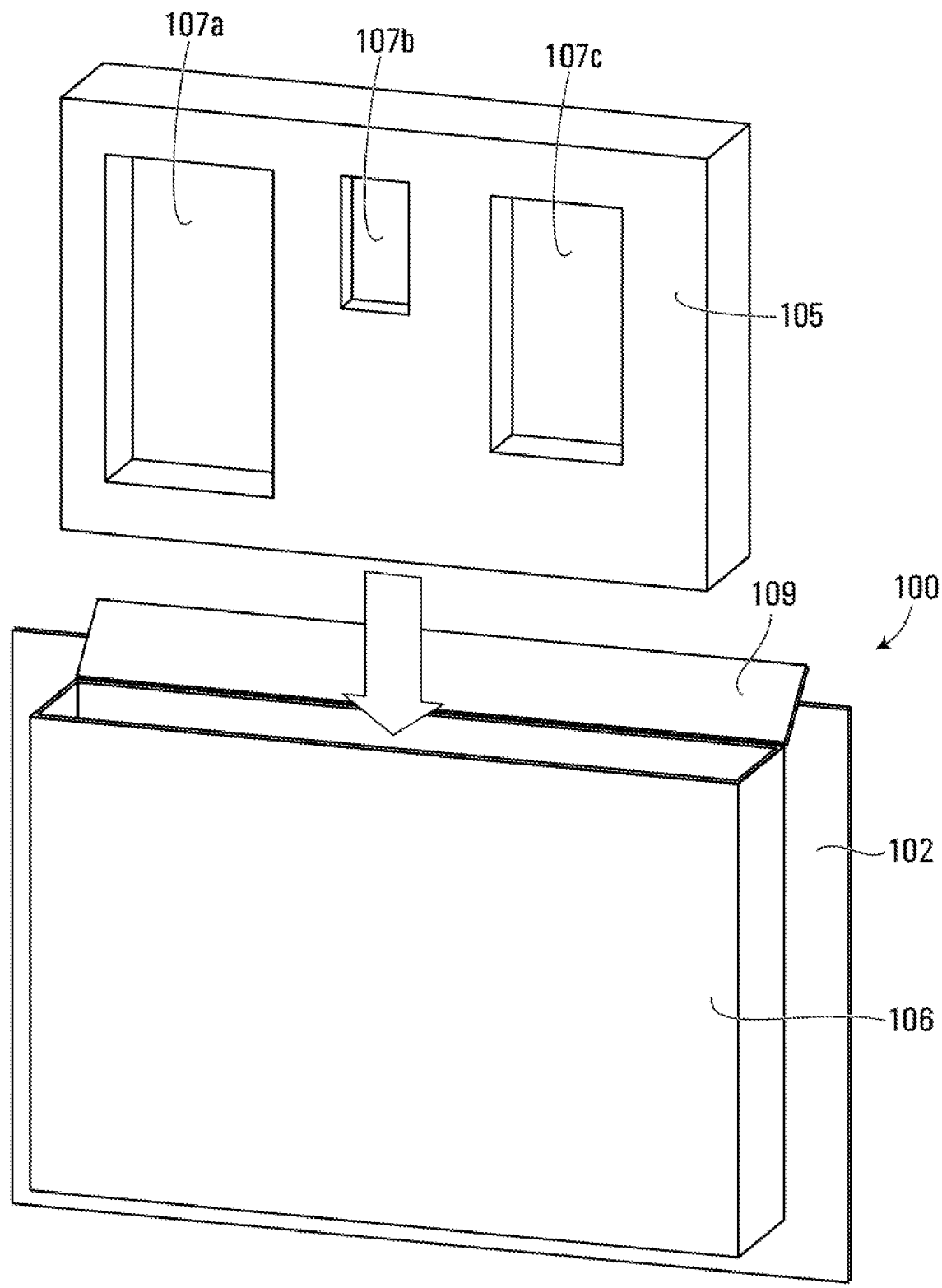
FIG. 14 shows an insert being inserted into a storage compartment of a storage device according to an embodiment of the disclosure.

Turning to FIG. 14, there is shown a foam insert 105 for inserting within the enclosure defined by a storage compartment 106. Foam insert 105 includes a number of recessed portions 107a-c formed therein. Each recessed portion 107a-c has dimensions similar to those of an item that is intended to be stored in its respective recessed portion 107a-c. For example, recessed portion 107a is sized to receive a mobile device, recessed portion 107b is sized to receive a key, and recessed portion 107c is sized to receive a tool for maintenance or repair of a bicycle, such as a multi-tool. Insert 105, according to some embodiments, may be made of materials other than foam.

According to some embodiments, a bag/pouch made, for example, of Neoprene may be placed within storage compartment 16 for the storage of items. Such a bag/pouch may be used alternatively or in addition to insert 105.

Although the mounting devices described herein have been disclosed in the form of clamps, according to some embodiments the mounting devices may take any of various other suitable forms. For example, mounting devices may comprise snap-fit connectors, or straps such as cable straps, zap straps, Velcro® straps, rubber straps, elastic straps, and/or any other suitable strap or similar device.

According to some embodiments, instead of the storage device comprising a storage compartment that is attached to a separate identification plate, a front face of the storage compartment may be inscribed with the means for identifying the rider. Thus, according to such embodiments, the storage compartment and identification plate are integrally formed, with the identification plate effectively forming the front face of the storage compartment. For example, the storage compartment and the identification plate may be moulded into a single, unitary component.

The storage compartment may be made, for example, from plastic, carbon fibre, or one or more other composite materials. According to some embodiments, metal may also be used.

The mounting brackets may be configured to slide up/down and/or left/right to assist with adjustment when mounting the storage device to the bike, for example when mounting the storage device to handlebars or front fork stanchions.

According to some embodiments, the storage device need not include the identification plate, and instead may simply include the storage compartment and mounting devices configured so as to enable the storage device to be attached to a front portion of a bicycle, such as a bicycle's handlebars, front fork, stanchions, or steer tube.

According to some embodiments, the storage device may be secured to the bicycle using a single mounting device, instead of multiple mounting devices. For example, the storage device may be secured to the bicycle using a single mounting device located, for example, either on a right side or a left side of the bicycle's stem. Furthermore, although embodiments of the storage device have generally been described as having an opening on a top end of the storage compartment, according to other embodiments the storage device may have an opening on a left side or a right side of the storage compartment.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A storage device for attaching to a bicycle, comprising:
a storage compartment having a front face and a rear face, wherein the front face comprises an identifier for identifying a rider of the bicycle; and
at least one mounting device extending from the rear face of the storage compartment and configured so as to enable the storage device to be attached to a front portion of the bicycle,
wherein the at least one mounting device comprises first, second, third, and fourth mounting devices extending from the rear face of the storage compartment and positioned relative to one another so as to enable the storage device to be attached to dual stanchions of a dual crown front fork of the bicycle, and to be attached between upper and lower crowns of the dual crowns, by attaching each of the first mounting device and the third mounting device directly to a first stanchion of the dual stanchions, and by attaching each of the second mounting device and the fourth mounting device directly to a second stanchion of the dual stanchions,
wherein at least one of the first, second, third, and fourth mounting devices comprises:
a clamp portion with apertures formed therein, and a conduit connecting the apertures; and
a strap for passing through the conduit to attach the at least one of the first, second, third, and fourth mounting devices to the first or second stanchion, and
wherein the clamp portion comprises a pair of rectangular surfaces connected by a curved surface for contacting the first or second stanchion, and wherein the apertures are provided in the rectangular surfaces.

2. The storage device of claim 1, wherein the first and second mounting devices are spaced apart by a distance of from about 2 inches to about 10 inches.

3. The storage device of claim 1, wherein the first and second mounting devices are spaced equally from an axis dividing the storage device into left and right halves.

4. The storage device of claim 1, wherein the first and second mounting devices are spaced apart by a distance of from about 6 inches to about 8 inches, and the first and third mounting devices are spaced apart by a distance of from about 3 inches to about 6 inches.

5. The storage device of claim 1, wherein the storage compartment comprises one or more securing members for securing one or more items to an exterior of the storage compartment.

6. The storage device of claim 5, wherein the one or more securing members comprise one or more straps.

7. The storage device of claim 1, wherein the storage compartment comprises first and second portions rotatably movable relative to one another from a closed position, in which access to an interior of the storage compartment is prevented, to an open position, in which access to the interior of the storage compartment is allowed.

8. The storage device of claim 1, wherein the storage compartment comprises one or more walls defining an interior of the storage compartment, and a cover movable relative to the one or more walls for enabling and preventing access to the interior of the storage compartment.

9. The storage device of claim 1, further comprising a removable bag or pouch stored within the storage compartment.

10. The storage device of claim 1, wherein the storage compartment is rectangular or trapezoidal.

11. The storage device of claim 1, wherein the identifier is on an identification plate forming part of the front face of the storage compartment.

12. The storage device of claim 1, wherein the identifier is on an identification plate attached to the front face of the storage compartment.

\* \* \* \* \*